United States Patent
Woodell et al.

(10) Patent No.: US 7,609,200 B1
(45) Date of Patent: Oct. 27, 2009

(54) RADAR DERIVED PERSPECTIVE DISPLAY SYSTEM

(75) Inventors: Daniel L. Woodell, Cedar Rapids, IA (US); Roy E. Robertson, Marion, IA (US); Nathanael A. Meyer, Coralville, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 11/807,594

(22) Filed: May 29, 2007

(51) Int. Cl.
G01S 7/04 (2006.01)
G01S 13/94 (2006.01)
G01S 13/95 (2006.01)

(52) U.S. Cl. .................. 342/176; 342/26 B; 342/63

(58) Field of Classification Search ............ 342/29–40, 342/176, 179, 26 B, 63–65
See application file for complete search history.

(56) References Cited

U.S. PATENT DOCUMENTS

| | | | |
|---|---|---|---|
| 2,930,035 A | 3/1960 | Altekruse | |
| 2,965,894 A | 12/1960 | Sweeney | |
| 2,994,966 A | 8/1961 | Senitsky et al. | |
| 3,153,234 A | 10/1964 | Begeman et al. | |
| 3,212,088 A | 10/1965 | Alexander et al. | |
| 3,241,141 A | 3/1966 | Wall | |
| 3,325,807 A | 6/1967 | Burns et al. | |
| 3,373,423 A * | 3/1968 | Levy | 342/65 |
| 3,397,397 A | 8/1968 | Barney | |
| 3,739,380 A | 6/1973 | Burdic et al. | |
| 3,815,132 A | 6/1974 | Case, Jr. et al. | |
| 3,866,222 A * | 2/1975 | Young | 342/185 |
| 4,760,396 A | 7/1988 | Barney et al. | |
| 5,945,926 A | 8/1999 | Ammar et al. | |
| 6,233,522 B1 * | 5/2001 | Morici | 701/208 |
| 6,278,799 B1 * | 8/2001 | Hoffman | 382/159 |
| 6,388,607 B1 | 5/2002 | Woodell | |
| 6,512,527 B1 | 1/2003 | Barber et al. | |
| 6,603,425 B1 | 8/2003 | Woodell | |
| 6,690,298 B1 | 2/2004 | Barber et al. | |
| 6,799,095 B1 | 9/2004 | Owen et al. | |
| 6,856,908 B2 * | 2/2005 | Devarasetty et al. | 702/3 |
| 7,023,375 B2 * | 4/2006 | Klausing et al. | 342/25 A |
| 7,026,956 B1 | 4/2006 | Wenger et al. | |
| 7,053,796 B1 | 5/2006 | Barber | |
| 7,057,549 B2 | 6/2006 | Block | |
| 7,064,680 B2 | 6/2006 | Reynolds et al. | |

(Continued)

OTHER PUBLICATIONS

Adams, Charlotte, "Synthetic Vision: Picturing the Future," *Avionics magazine, Solutions for Global Airspace Electronics*, Oct. 2006, cover and pp. 22-29.

(Continued)

*Primary Examiner*—Thomas H Tarcza
*Assistant Examiner*—Cassi Galt
(74) *Attorney, Agent, or Firm*—Daniel M. Barbieri (57) ABSTRACT

An aircraft-based terrain display system includes a radar system configured to measure terrain data in proximity to an aircraft. The system further includes a memory coupled to the radar system and configured to store terrain data associated with the terrain data collected from the radar system. A processor is coupled to the memory and configured to use the terrain data stored in memory to generate a terrain image having a perspective view. An aircraft display coupled to the processor is configured to display the terrain image.

16 Claims, 7 Drawing Sheets

U.S. PATENT DOCUMENTS

| | | | |
|---|---|---|---|
| 7,098,913 B1 | 8/2006 | Etherington et al. | |
| 7,109,913 B1 | 9/2006 | Paramore et al. | |
| 7,123,260 B2 | 10/2006 | Brust | |
| 7,180,476 B1 * | 2/2007 | Guell et al. | 345/7 |
| 7,191,406 B1 | 3/2007 | Barber et al. | |
| 7,352,292 B2 * | 4/2008 | Alter et al. | 340/945 |
| 7,375,678 B2 * | 5/2008 | Feyereisen et al. | 342/180 |
| 7,379,796 B2 * | 5/2008 | Walsdorf et al. | 701/9 |
| 2008/0158256 A1 * | 7/2008 | Russell et al. | 345/629 |

OTHER PUBLICATIONS

Adams, Charlotte, "Synthetic Vision: Picturing the Future," *Avionics magazine*, Oct. 1, 2006, printed from website www.aviationtoday.com, 4 pages.

Blue Mountain Avionics' Products, printed from website www.bluemountainavionics.com on Aug. 28, 2007, 4 pages.

"MountainScope™ on a TabletPC," PCAvionics™, printed from website www.pcavionics.com on Aug. 28, 2007, 1 page.

"PCAvionics: Makers of MountainScope™, A New Dimension in Situational Awareness," PCAvionics™, printed from website www.pcavionics.com on Aug. 28, 2007, 1 page.

Pictures of Delphins, printed from website www.tunnel-in-the-sky.tudelft.nl on Aug. 28, 2007, 4 pages.

"TAWS Terrain Awareness and Warning System," Universal® Avionics, printed from website www.uasc.com on Aug. 28, 2007, 2 pages.

TAWS Class A and Class B, Terrain Awareness and Warning Systems, Universal® Avionics Systems Corporation, Sep. 2007, 6 pages.

Technical Standard Order, TSO-C115b, Airborne Area Navigation Equipment Using Multi-Sensor Inputs, Sep. 30, 1994, 11 pages, Department of Transportation, Federal Aviation Administration, Washington, DC.

Van Kasteren, Joost, :Tunnel-in-the-Sky, Synthetic vision simplifies the pilot's job and enhances safety, printed from website www.delftoutlook.tudelft.nl on Aug. 28, 2007, 13 pages.

\* cited by examiner

RADAR DERIVED PERSPECTIVE DISPLAY SYSTEM

BACKGROUND OF THE INVENTION

The present application relates generally to the field of aircraft display systems.

The present invention more particularly relates to aircraft systems configured to generate a radar derived perspective terrain display and methods for the same.

Aircrafts often include a number of aircraft display systems that show, indicate, or otherwise display situational information to the occupants of the aircraft, typically the pilots. For example, aircraft display systems typically display weather, aircraft diagnostics and communications information. Some aircraft display systems also display terrain. Terrain displays show some type of visual indication of terrain determined to be ahead of or below the aircraft.

Terrain awareness and avoidance mechanisms are important features of modern aircraft. A variety of terrain awareness systems have been developed to provide the pilot heightened levels of terrain awareness. These solutions include ground proximity warning systems, database terrain awareness and warning systems, synthetic vision database displays, and enhanced vision sensors. Each of these techniques suffer from a number of challenges or problems. For example, the database driven solutions use sensed position, aircraft altitude, and terrain database information to build a terrain display. These database driven solutions are limited by the accuracy and completeness of the database and the accuracy of a sensed navigation position. Due to the speeds at which aircraft travel, inaccuracies and errors in the database and position sensor are undesirable.

Database driven solutions and enhanced vision sensor solutions typically utilize only a plan or overhead display view of terrain. This solution is undesirable because it is difficult for pilots to quickly determine absolute and relative altitude of the various terrain features shown in the display. Some systems also include vertical situation displays that show a side or horizontal view of terrain altitude. This solution is also undesirable because it is difficult for pilots to quickly determine the proximity or range of the various terrain features shown on the display in relation to the aircraft. Furthermore, if weather and navigational elements are shown on the same display as the terrain features, it may be difficult for a pilot to distinguish displayed weather elements and navigational elements from terrain details because of the display image's two dimensional nature.

Horizontal views provide for the graphical display of terrain altitude ahead of the aircraft, but are typically only capable of displaying the terrain along the heading line of the aircraft. This narrow view of the terrain ahead of the aircraft means that the pilot may not be made aware of maneuver options that are available to avoid obstacles. For example, if an aircraft were headed directly for a water tower, the display would show an obstacle at a fixed height and an undetermined width directly in front of the aircraft. The pilot would not be able to distinguish a water tower from a mountain or an infinite wall because the obstacle's width, even if relatively narrow, would extend across the entire display. With such a narrow view, the pilot would determine that the only option for avoiding the object is to increase altitude. While increasing altitude would be ideal for an infinite wall of a fixed height, other maneuvers or combinations of maneuvers might be more effective for avoiding objects of very narrow width or whose height tapers up or down, such as a water tower or a mountain. To avoid the water tower, the pilot might decide to turn the aircraft to the left or right rather than increase altitude, or to avoid a mountain that tapers up to the left and down to the right, the pilot might simultaneously turn the craft to the right and increase altitude.

Plan view and horizontal view terrain displays typically suffer from an additional display problem if aircraft-based radar is used to detect terrain. Aircraft-based radar cannot determine the altitude of terrain areas behind tall terrain features because of the radar-blocking nature of terrain. Indeterminable terrain blocked from the view of radar is referred to as "radar shadow" and may result in missing portions or incorrect portions on a horizontal or plan terrain displays. Radar shadow is undesirable because it presents an unnatural or broken terrain view which results in a display that is difficult for a pilot to read. Furthermore, radar shadow adds another element to the display that the pilot needs to recognize and interpret properly.

Terrain or ground warning systems which do not provide a complete display of terrain may provide a less than an optimal amount of information to pilots. Some systems, for example, will trigger a warning when an aircraft's flight path is determined to be on a collision path or close to a collision path with terrain elements. In the absence of an easy to read and highly indicative terrain detail display, the pilot may only attempt pulling-up when a complete terrain display might have indicated that an easier route would have been to pull up and turn to the left, for example.

Consequently, there exists a need for improved methods and systems for accurately displaying radar derived terrain information in a broad perspective view that allows the pilot to gauge the height, range and contour of the terrain features near the aircraft to make appropriate terrain avoidance maneuver decisions.

It would be desirable to provide a system and/or method that provides one or more of these other advantageous features. Other features and advantages will be made apparent from the present specification. The teachings disclosed extend to those embodiments which fall within the scope of the appended claims, regardless of whether they accomplish one or more of the aforementioned needs.

SUMMARY OF THE INVENTION

One embodiment of the invention relates to an aircraft-based terrain display system includes a radar system configured to measure terrain data in proximity to an aircraft. The system further includes a memory coupled to the radar system and configured to store terrain data associated with the terrain data collected from the radar system. A processor is coupled to the memory and configured to use the terrain data stored in memory to generate a terrain image having a perspective view. An aircraft display coupled to the processor is configured to display the terrain image.

Another embodiment of the invention relates to a method of generating a terrain graphic. The method includes determining terrain data using radar beams cast from an aircraft-based radar system. The method further includes generating a perspective terrain image based on the determined terrain data; and displaying the perspective terrain image.

Another embodiment of the invention relates to a radar-derived terrain display system. The system includes means for determining terrain altitude data using an aircraft-based radar system. The system also includes means for storing the determined terrain altitude data and means for generating a perspective terrain image based on the stored determined terrain altitude data. The system yet further includes means for displaying the perspective terrain image.

Alternative exemplary embodiments relate to other features and combinations of features as may be generally recited in the claims.

BRIEF DESCRIPTION OF THE DRAWINGS

The disclosure will become more fully understood from the following detailed description, taken in conjunction with the accompanying drawings, wherein like reference numerals refer to like elements, in which.

DETAILED DESCRIPTION OF THE PREFERRED EMBODIMENTS

Although the description below contains many specificities, these specificities are utilized to illustrate some of the exemplary embodiments of this disclosure and should not be construed as limiting the scope of the disclosure. The scope of this disclosure should be determined by the claims, their legal equivalents and the fact that it fully encompasses other embodiments which may become apparent to those skilled in the art. A method or device does not have to address each and every problem to be encompassed by the present disclosure. All structural, chemical and functional equivalents to the elements of the below-described disclosure that are known to those of ordinary skill in the art are expressly incorporated herein by reference and are intended to be encompassed by the present claims. A reference to an element in the singular is not intended to mean one and only one, unless explicitly so stated, but rather it should be construed to mean at least one. No claim element herein is to be construed under the provisions of 35 U.S.C. § 112, sixth paragraph, unless the element is expressly recited using the phrase "means for." Furthermore, no element, component or method step in the present disclosure is intended to be dedicated to the public, regardless of whether the element, component, or method step is explicitly recited in the claims.

Figure 1:
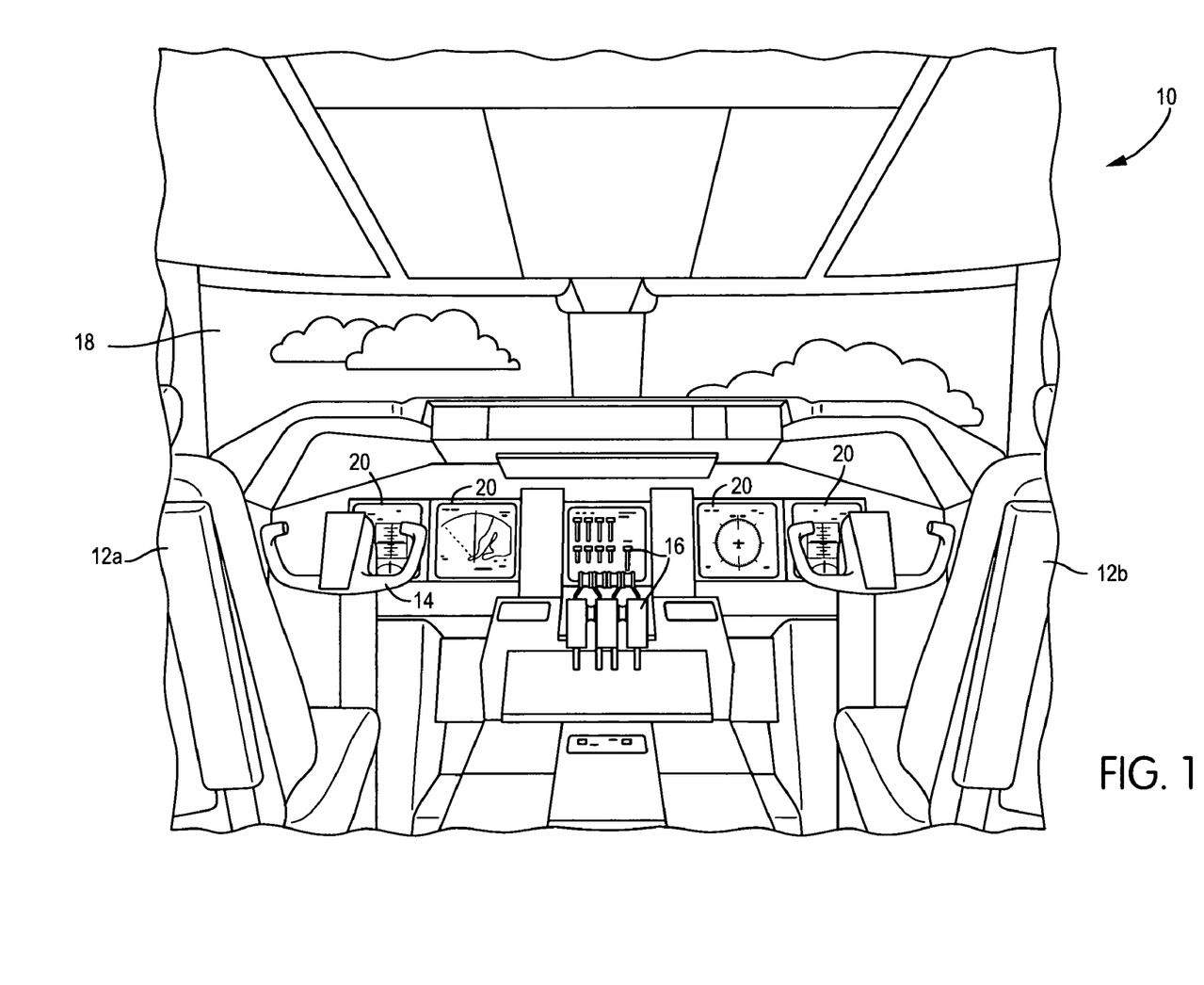
FIG. 1 is a perspective view of an aircraft control center, according to an exemplary embodiment.

Referring to FIG. 1, an illustration of an aircraft control center 10 is shown, according to an exemplary embodiment. Aircraft control center 10 may include a pilot seat 12a, a co-pilot seat 12b, an aircraft control stick 14, a plurality of flight controls 16 and flight displays 20. A pilots sitting in one of seats 12a and 12b may utilize aircraft control stick 14 to maneuver craft 100. A pilot may visually monitor weather and terrain through windshield 18. When the pilot utilizes windshield 18, however, his visual range is often limited for a number of reasons. For one, the size of the physical structures of the aircraft control center may block the pilot's view, particularly any view extending below the flight path. Also, weather or darkness may limit the pilot's view out windshield 18.

To overcome these visual limitations pilots utilize flight displays 20 to increase their effective visual range and to increase the amount of information available to them. According to an exemplary embodiment, the various displays of aircraft control center 10 may be configured to show weather, terrain, fixed obstacles, moving obstacles (e.g., other aircrafts), flight characteristics (e.g., altitude, speed), or any combination thereof.

Figure 2:
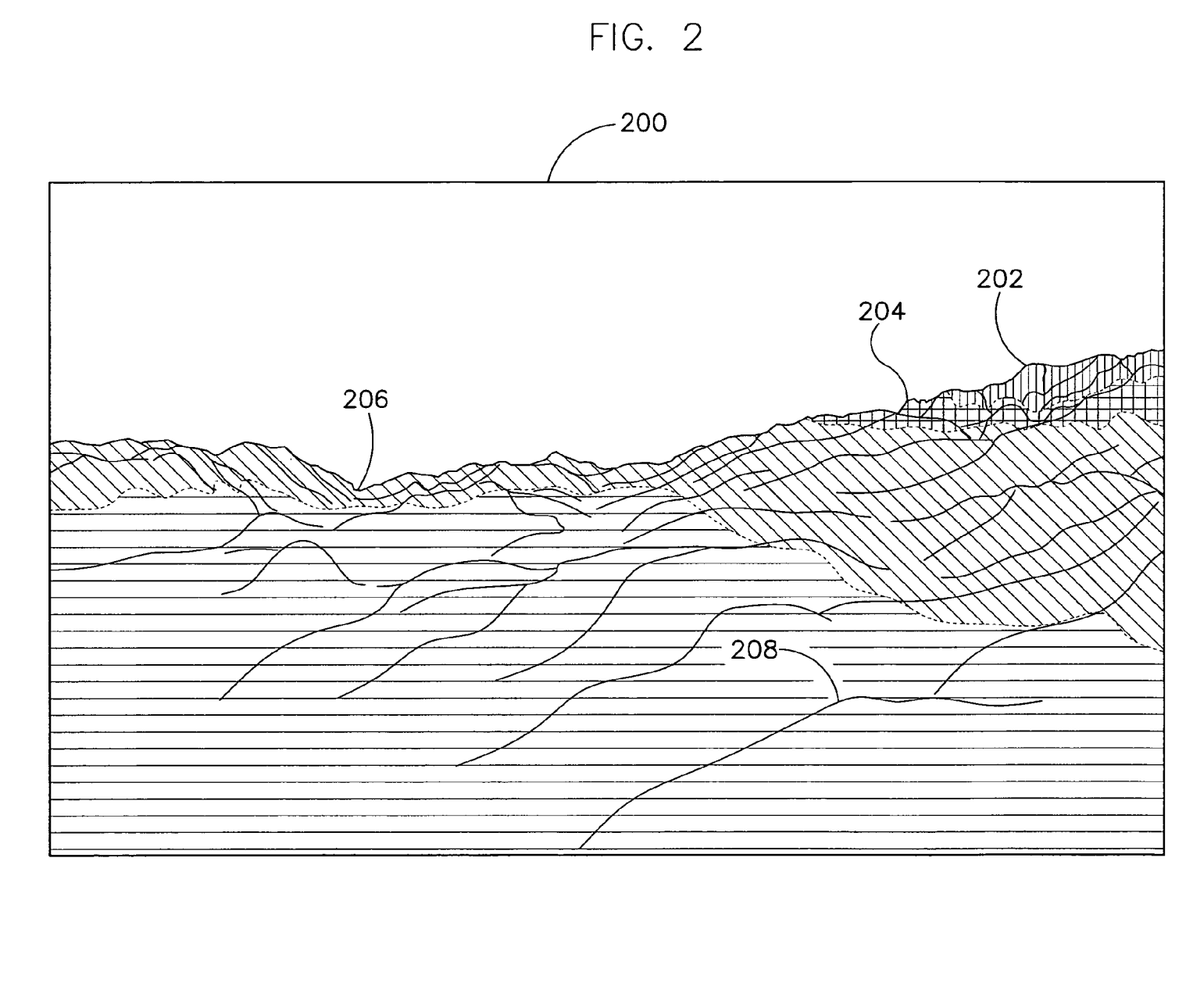
FIG. 2 is an illustration of a three-dimensional perspective terrain display image, according to an exemplary embodiment.

According to an exemplary embodiment, aircraft control center 10 includes a radar-derived terrain display system. FIG. 2 provides a three-dimensional perspective image 200 as an example of output from a radar-derived terrain display system. Three-dimensional perspective display image 200 shows a generated view of the terrain in front of and below the nose or line of flight of the aircraft. According to an exemplary embodiment, the three-dimensional perspective display image 200 is a rendered or generated view that substantially replicates, at least in terms of geometry, the view that a pilot would see if he or she could directly view the terrain extending below the line of flight of the aircraft. Three-dimensional perspective display image 200 may be a contoured range-elevation display of the terrain ahead of the aircraft from the pilot's vantage point. According to various exemplary embodiments, the three-dimensional perspective display image or view has a vertical viewing window of about 20 degrees (e.g., about 10 degrees above the horizontal plane extending from the nose and about 10 degrees below the horizontal plane extending from the nose of the aircraft is shown on the display). Other exemplary embodiments may include other views. For example, a vertical viewing range of about 20 degrees might be maintained, but the view might show about 15 degrees below horizontal and about 5 degrees above horizontal. It is important to note larger or smaller viewing angle displays may be provided (e.g., larger than 20 degrees, smaller than 20 degrees).

Referring still to FIG. 2, according to various exemplary embodiments, three-dimensional perspective display image 200 includes visual indicators in addition to terrain geometry structure to indicate features of the terrain or environment. These features may include, for example, altitude, determined hazards, weather features, variable obstacles, buildings, water, etc. According to the exemplary embodiment shown in FIG. 2, various altitude levels are indicated with different shading, line identification, and/or color. Area 202, for example, is a high altitude area and may be indicated as such on display 200 as having a red indicating color. Area 204 is a medium altitude area and may be rendered as having a yellow indicating color. Areas 206 and 208 are low altitude areas and may be shown in blue. According to various other exemplary embodiments, high terrain area 202 may flash, pulse, enlarge, be accompanied by audible warnings, or any combination thereof to provide a warning indication or signal to a user. It should be appreciated that different color schemes, shading styles, lines, and/or other features may be provided.

Figure 3:
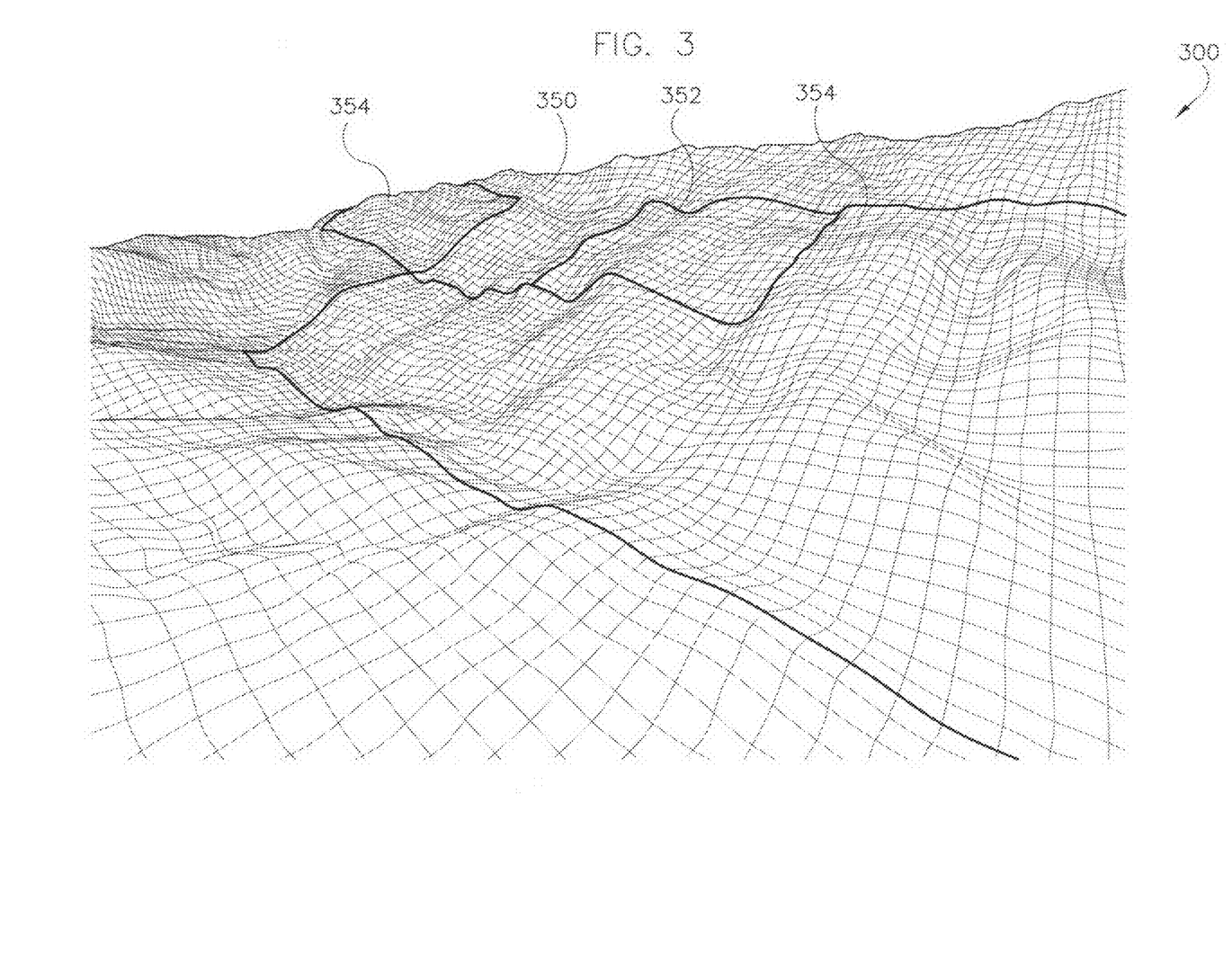
FIG. 3 is an illustration of a three-dimensional perspective terrain display image, according to another exemplary embodiment.

Referring to FIG. 3, a three-dimensional perspective display image 300 is shown, according to another exemplary embodiment. In FIG. 3, areas of differing altitudes are distinguished based not only on indicating shading, but patches or region lines have been defined and are also shown. For example, areas 352 and 354 are defined in polygonal patches on base terrain 350. FIG. 3 also displays hazard or altitude indication by using lines or patterns (e.g., checkerboard, etc) in addition to color. According to various other exemplary embodiments, hazard or terrain indication on the three-dimensional perspective display is shown by drawing a circle or other geometric overlay icons or graphics around or pointing to the hazard or terrain feature.

Figure 4:
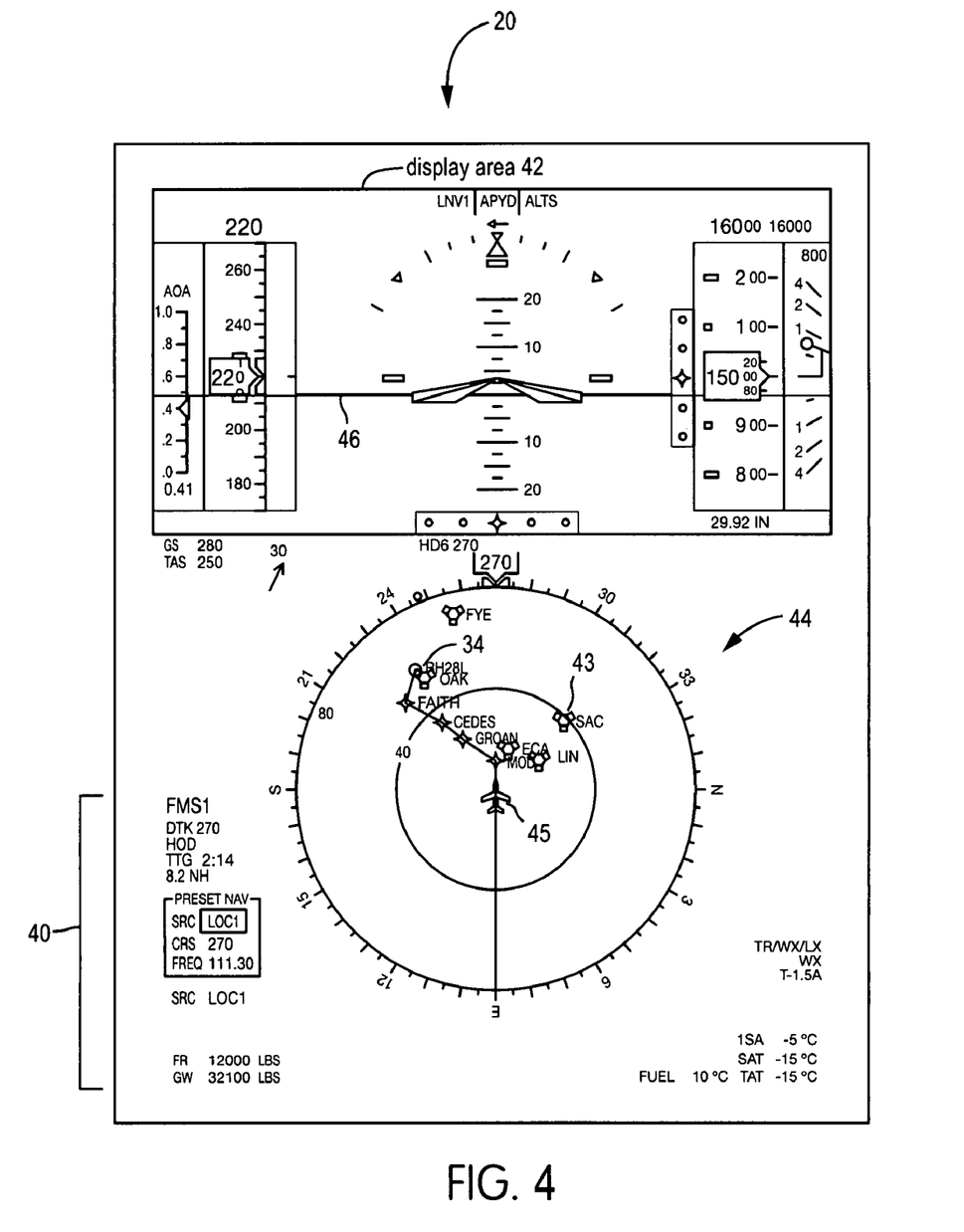
FIG. 4 is an illustration of a display screen.

Referring to FIG. 4, a flight display 20 that may display a three-dimensional perspective display image (e.g., image 200, 300 of FIGS. 2 and 3) is shown, according to an exemplary embodiment. Flight display 20 may include a first display area 42 and a second display area 44. One or more display areas may include indicators of flight characteristics 40, aircraft position 45, and various other navigational aids 43. According to an exemplary embodiment, the three-dimensional perspective display image may be shown in display area 42. As shown in FIG. 4, display area 44 may display an overhead plan view of an aircraft icon and other indicators as determined by various sensors, communications systems, databases, and/or radar of the system. Horizon line 46 is shown in first display area 42.

Figure 5:
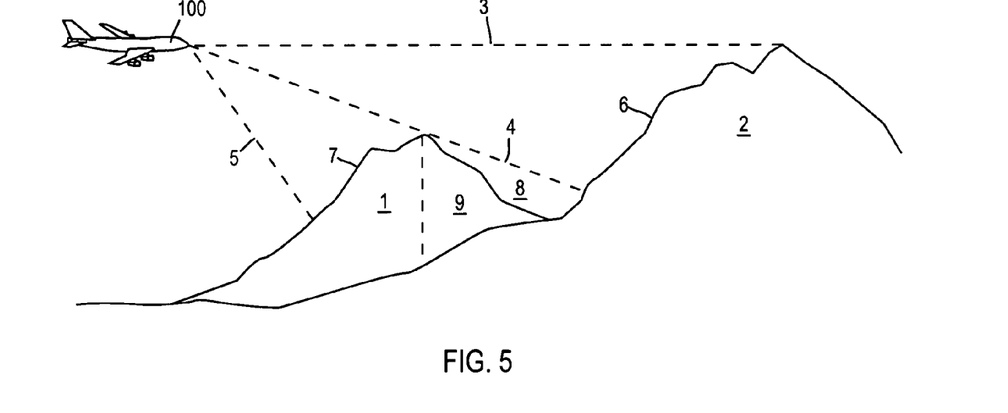
FIG. 5 is a diagram showing how a perspective terrain display might be derived by aircraft-based radar systems.

Referring now to FIG. 5, aircraft 100 is shown flying over terrain elements 1 and 2. One problem with radar-derived plan or horizontal views is that aircraft-based terrain radar is subject to what is known as "radar shadow," where the aircraft does not know the altitude of some terrain elements because radar beams are blocked by other terrain elements. This concept is illustrated in FIG. 5. Radar beams cast from aircraft 100 are shown in positions 3, 4, and 5. While radar may successfully extract return data regarding the visible portions 6 and 7 of terrain elements 1 and 2 when scanning between positions 3, 4, and 5 terrain portions 8 and 9 are unknown because any beam cast at an angle below position 4 will return information regarding terrain element 1 rather than any information regarding terrain portions 8 and 9. Plan or horizontal views expose areas of radar shadow and the resulting two dimensional image generally looks incomplete and/or unnatural. By using a perspective view, areas of radar shadow remain hidden behind the terrain elements that caused the shadow just as they would be if the pilot looked at the terrain from the aircraft windshield and the three dimensional image will appear to be a complete and natural contour of the terrain ahead of and below the aircraft.

According to an exemplary embodiment, aircraft 100 utilizes a beam-to-beam technique to provide a relatively high angular resolution in elevation. As illustrated in FIG. 5, the radar system rapidly scans the terrain at multiple angles to generate a range-elevation terrain map as the plane moves forward. The rate and range at which the radar system scans the terrain can be adjusted for aircraft speed, desired resolution, altitude, radar system capabilities or other factors. The newly acquired measurement data is combined with existing data to form a composite data field that will typically be much larger that the radar direct measurement field because the previously acquired data points do not become outdated until the data point passes beyond the radar systems display range. The image viewed by the pilot on the terrain display is constantly updated from the newly acquired information to provide what appears to the pilot as an animated view of the terrain ahead of and below the aircraft. In another exemplary embodiment the radar system divides scan time between terrain and weather measurements, and/or other modes such as obstacle detections, vertical assessments of weather, etc.

It is important to note that while aircraft 100 may utilize a beam-to-beam technique, aircraft 100 (and a radar system thereof) may utilize any number of alternative and/or additional techniques to measure or estimate terrain elevation. For example, a radar system of aircraft 100 might use monopulse radar techniques, conical scanning techniques, sequential lobing techniques, multiple beams-on-receive techniques, interferometric methods, volumetric scanning, and/or any other suitable technique for deriving terrain features using an aircraft-based radar system.

Figure 6:
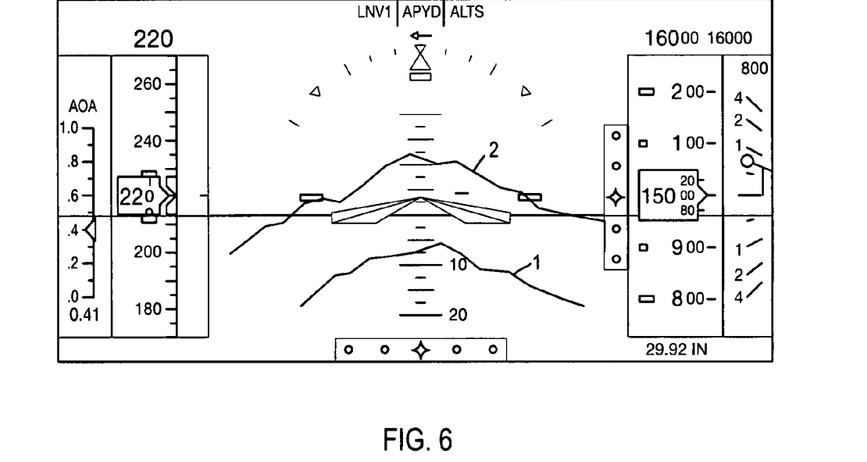
FIG. 6 is a simplified illustration of a display screen that might show the radar-derived terrain detail shown in FIG. 5.

Referring now to FIG. 6, a simplified illustration of a display screen is provided. An actual display would provide contoured images similar to those in FIGS. 2 and 3. FIG. 6 illustrates how the radar system would detect and display terrain elements 1 and 2 of FIG. 5. Areas 9 and 8 are not shown on the display screen, but this would be acceptable to a pilot as the display shows the essential terrain information while looking natural, with the range and elevation of terrain elements 1 and 2 being readily identifiable after a quick glance at the display.

Figure 7:
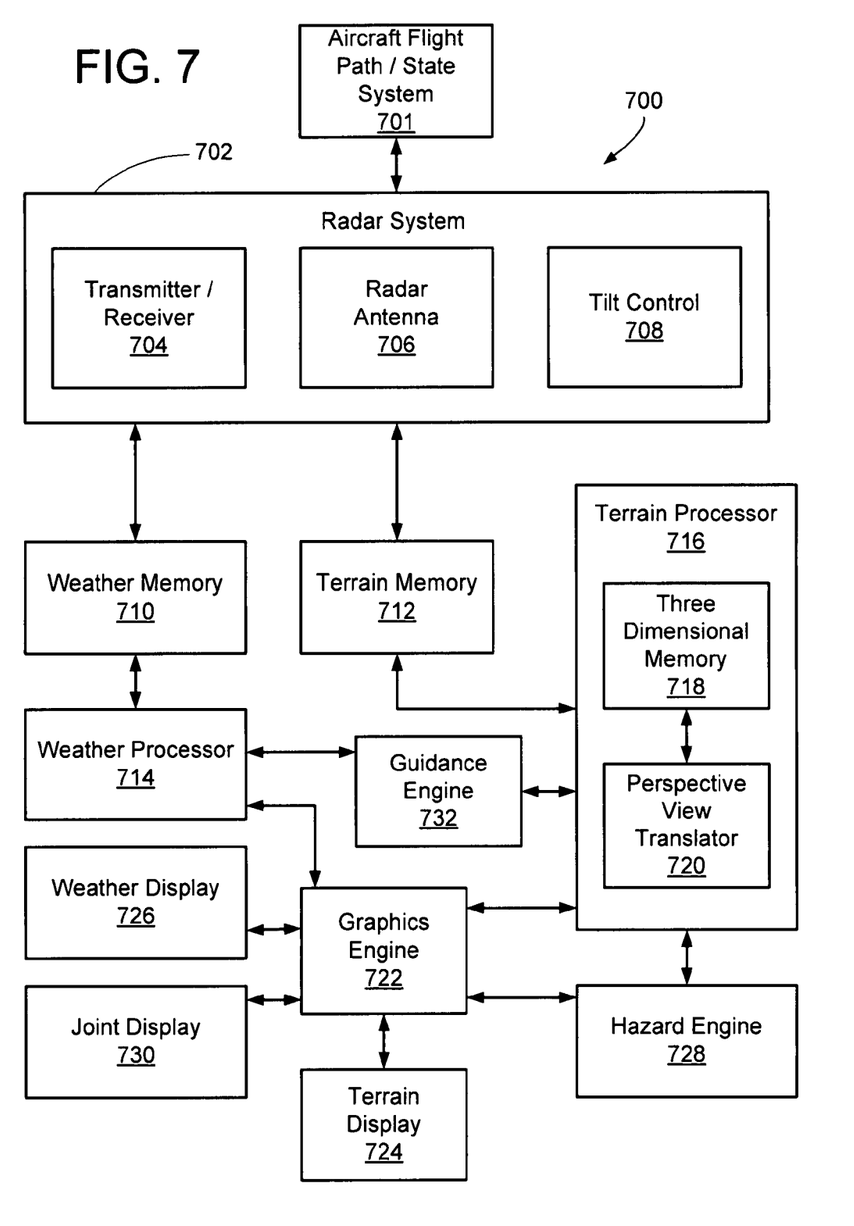
FIG. 7 is a block diagram of terrain display systems, weather display systems, and radar systems, according to an exemplary embodiment.

Referring to FIG. 7, a simplified block diagram of an exemplary radar-derived terrain display system 700 is shown. System 700 includes an aircraft flight path system 701, radar system 702, weather processing and display components and terrain processing and display components. Radar system 702 includes transmitter and receiver 704, radar antenna 706, and tilt control 708. Transmitter and receiver 704 are functionally coupled to radar antenna 706. Tilt control 708 automatically controls the tilt angle of antenna 706. Tilt control 708 adjusts between antenna sweeps, the tilt angle of antenna 706 by small, predetermined angles. Aircraft flight path or state system 701 provides information or data to radar system 702 so that radar system 702 and/or other components of system 700 may use the information. For example, radar system 702 may use input received from aircraft flight path or state system 701 to determine where to cast radar beams and/or which returns to retain in memory. The system may also use various data from system 701 such as location, heading, speed, or any other variable of the aircraft flight path, plans, or flight state. It is important to note that tilt control 708 may be replaced by other control types depending on the type of radar system used.

Referring further to FIG. 7, radar system 702 is coupled to weather memory 710 and terrain memory 712. Memory 710 and 712 may be multi-scan, multi-tilt angle memory or a different type of memory suitable for the type of radar system used (e.g., volumetric radar, sequential lobing radar, etc.). According to exemplary embodiments utilizing multi-scan, multi-tilt radar, the memory is capable of storing in a readily addressable and rapidly retrievable manner, at least two, but preferably more, data sets resulting from two or more antenna sweeps at different tilt angles. Weather memory 710 is coupled to weather processor 714 and terrain memory 712 is coupled to terrain processor 716. Processors 714 and 716 may generally be configured to read the radar returns stored in memory 710 and 712 to analyze the returns at different tilt angles. Multi-sweep multi-tilt radar operation and processing methods are generally described in U.S. Pat. Nos. 6,603,425, 6,424,288, and 6,603,425 to Woodell et al. Radar system 702 may be a multiple scanning radar system such as a WXR-2100 MULTISCAN Weather Radar System manufactured by Rockwell Collins Inc., a volumetric weather radar system, a sequential lobing radar, or any other suitable radar system previously mentioned or otherwise, which are discussed as an exemplary radar system in which or with which to incorporate the present invention. According to an exemplary embodiment, weather processor 714 and terrain processor 716 share the time of radar system 702 so that during some sweeps the radar system is casting radar beams configured to return weather data and during other sweeps the radar system is casting radar beams configured to return terrain data. According to various alternative embodiments, separate terrain and weather radar systems may be provided.

Referring yet further to FIG. 7, terrain processor 716 may include memory 718 and perspective view translator 720. According to an exemplary embodiment, after terrain processor 716 (or a processor of the radar system) extracts terrain data points (e.g., range and elevation data) based on radar returns, the determined terrain data points may be processed by terrain processor 716 to create a composite terrain data set (e.g., three-dimensional data set, x-y-z data set, row-theta-range data set, row-elevation-range data set, angle-space data set, distance-from-center data set, range-elevation data set, angle-angle data set, volumetric data set, etc.) in memory 718 (e.g., a three dimensional memory suitable for storing any of the previously mentioned data sets, etc) based on radar returns. Processor 716 may conduct any number of intermediate processing tasks such as translating the terrain data set in memory 718 to account for aircraft movement or continuously combining new terrain data with old terrain data to form a composite terrain data field. According to an exemplary embodiment, this composite terrain data field will typically be larger than the direct measurement field of the radar. Perspective view translator 720 may be configured to prepare composite terrain data of memory 718 for display. This activity may include rendering or projecting the three dimensional data of the composite terrain data into a two dimensional display image or image to be displayed.

Graphics engine 722 is coupled to terrain processor 716, weather processor 714, weather display 726, terrain display 724, joint weather/terrain display 736, and hazard engine 728. Graphics engine 722 is generally configured to send display signals to one or more aircraft display systems (e.g., terrain display 724, weather display 726, joint weather/terrain display 730, etc.) based on data or other input signals from processing systems (e.g., weather processor 714, terrain processor 716, hazard engine 728, etc.). According to an exemplary embodiment, graphics engine 722 renders three dimensional image data provided by processors 714 and 716 for display on a two dimensional display screen. According to various other embodiments, graphics engine 722 receives pre-rendered or partially pre-rendered images from processors 714 and 716 and serves as an assisting graphics processor and/or display driver. According to an exemplary embodiment, graphics engine 722 is configured to render an image approximating or simulating a pilot's forward field of view. According to various exemplary embodiments, graphics engine 722 is configured to render an image approximating or simulating a pilot's field of view along the planned flight path. According to various other exemplary embodiments, graphics engine 722 is configured to simulate a pilot's field of view plus an additional viewing amount down and at an angle from the plane extending from the aircraft's nose. According to another exemplary embodiment, graphics engine 722 is configured to simulate a pilot's field of view plus an additional viewing amount down and at an angle from the plane extending from the aircraft's nose, yet refraining from displaying an angle that would reveal areas of radar shadow. Graphics engine 722 may contain a downward angle setting or routine relating to radar system characteristics or capabilities. Graphics engine 722 (or another processing component of the system) may make a maximum downward display angle determination that will not show (or at least will not frequently show) areas of radar shadow.

Radar derived terrain display system 700 may also include a hazard engine 728, according to an exemplary embodiment. Hazard engine 728 may detect potential hazards to the aircraft. Hazard engine 728 may receive inputs from and/or send outputs to coupled terrain processor 716, weather processor 714 and/or graphics engine 722. The hazard engine may determine, for example, that various terrain and/or weather features or other areas should be identified as hazards and communicated to the pilot (e.g., graphically, audibly, or otherwise). For example, areas of low terrain may be color coded on the perspective terrain display or otherwise identified to show hazard levels or other features presented by the terrain. The terrain hazard level and resulting color coding may be determined by any of several methods including measuring absolute terrain relative to the aircraft flight path (received from aircraft flight path system 701, for example), examining angular position of the terrain relative to the aircraft flight path, and/or calculating an aircraft maneuver envelope or performance maneuver required to avoid the terrain or by various other determinations. Any number of hazard encoding, indicating, displaying and/or processing tasks may be performed by hazard engine 728 (e.g., hazard icons may be generated, audio warnings may be provided via an audio system, textural warnings may be displayed at a cockpit display, hazard features may be circled, boxed, color-coded, etc.).

According to an exemplary embodiment, the system also includes a guidance engine 732 that may work with processors 714 and 716 to help guide the aircraft around and/or over any detected weather, terrain, or obstacle features. Guidance engine 732 may receive inputs from aircraft flight path/state system 701. According to other various exemplary embodiments, guidance engine 732 may also be coupled to hazard engine 728 and/or graphics engine 722 so that guidance paths or instructions may be displayed on any one of displays 724, 726, or 730. According to yet other various exemplary embodiments, guidance engine 732 may generate other warnings (e.g., audible warnings such as "pull up and left", etc.).

Figure 8:
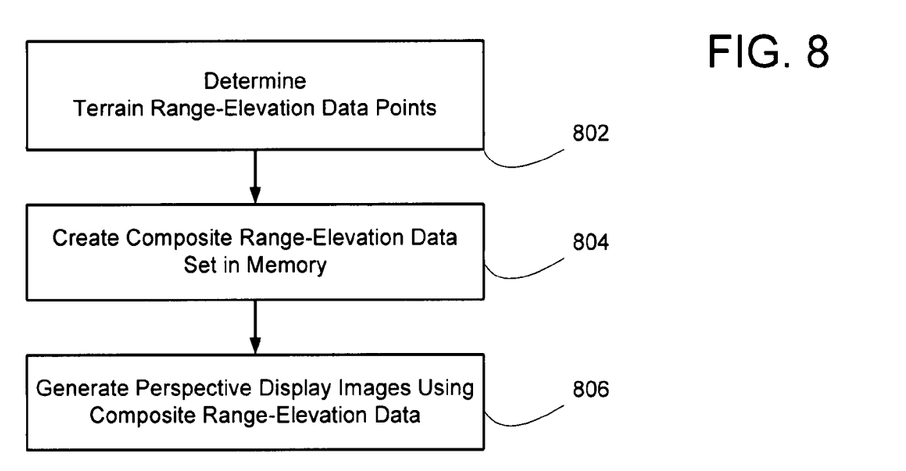
FIG. 8 is a basic flow chart of terrain display system operating procedures, according to an exemplary embodiment.

Referring now to FIG. 8, a basic flow chart of the operation of a radar-derived terrain display system is shown, according to an exemplary embodiment. The system may determine terrain data points (e.g., range-elevation data points) based on radar returns (step 802). The system may then process the terrain data to create a composite terrain data set (e.g., a composite range-elevation data set) in memory (step 804). Once a composite terrain data set has been created, the system may generate perspective display images using the data (step 806).

Figure 9:
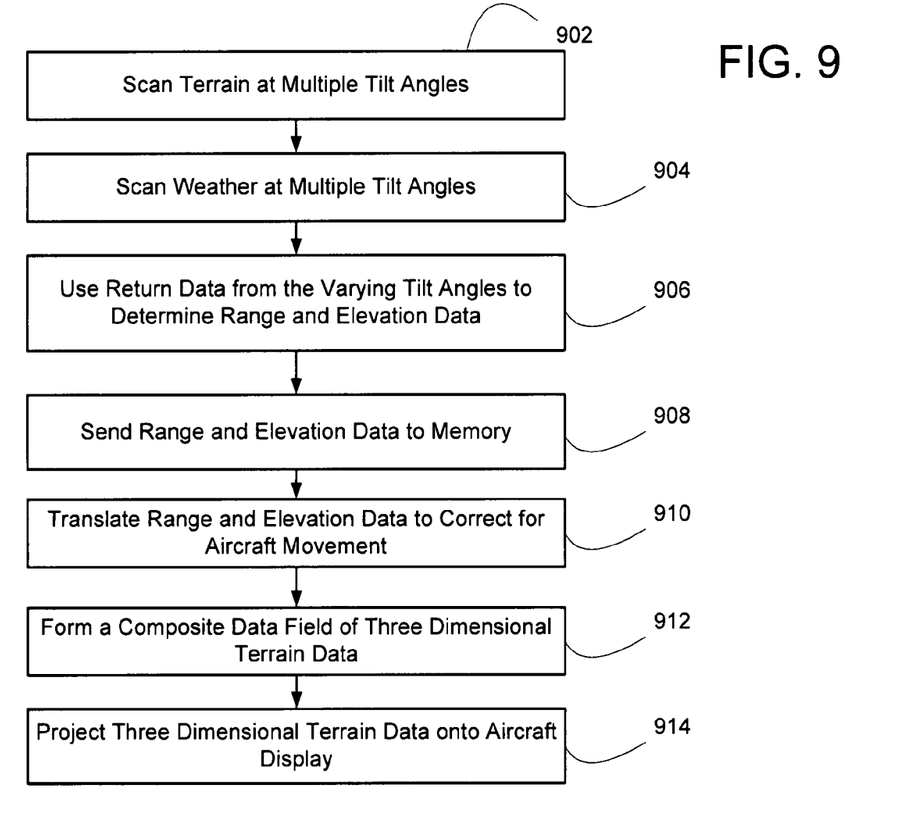
FIG. 9 is a detailed flow chart of terrain display system operating procedures, according to an exemplary embodiment.

Referring now to FIG. 9, a detailed flow chart of the operation of a radar-derived terrain display system is shown, according to an exemplary embodiment. The system may use a radar system to scan for terrain (step 902) and weather (step 904) at multiple tilt angles. These steps may include any number of transmitting, tilting, sweeping, scanning, receiving, and processing steps as may be required to extract or estimate accurate range-elevation terrain data points. The system may then use return data from the varying radar scans to determine range and elevation data (step 906) or terrain data points. Once range elevation data has been determined, the data may be sent to a terrain data memory (e.g., range elevation memory) (step 908). During or throughout the operation of the radar-derived terrain display system, terrain data may be translated or transformed to correct for aircraft movement (step 910). As multiple sets of terrain data are sent to memory and processed, a composite data field of three dimensional terrain data may be formed (step 912). A graphics processor may read the three dimensional terrain data to project the data onto a two dimensional aircraft display in a three dimensional perspective view (step 914).

Although specific steps are shown and described in a specific order, it is understood that the method may include more, fewer, different, and/or a different ordering of the steps to perform the function described herein.

The exemplary embodiments illustrated in the figures and described herein are offered by way of example only. Accordingly, the present application is not limited to a particular embodiment, but extends to various modifications that nevertheless fall within the scope of the appended claims. The order or sequence of any processes or method steps may be varied or re-sequenced according to alternative embodiments.

The present application contemplates methods, systems and program products on any machine-readable media for accomplishing its operations. The embodiments of the present application may be implemented using an existing computer processor, or by a special purpose computer processor for an appropriate system, incorporated for this or another purpose or by a hardwired system.

It is important to note that the construction and arrangement of the radar derived perspective display and hazard enunciation system as shown in the various exemplary embodiments is illustrative only. Although only a few embodiments of the present application have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors and orientations) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application as defined in the appended claims. The order or sequence of any process or method steps may be varied or re-sequenced according to alternative embodiments. In the claims, any means-plus-function clause is intended to cover the structures described herein as performing the recited function and, not only structural equivalents, but also equivalent structures. Other substitutions, modifications, changes and omissions may be made in the design, operating conditions and arrangement of the exemplary embodiments without departing from the scope of the present application as expressed in the appended claims.

As noted above, embodiments within the scope of the present application include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store a desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

It should be noted that although the diagrams herein may show a specific order of method steps, it is understood that the order of these steps may differ from what is depicted. Also two or more steps may be performed concurrently or with partial concurrence. Such variation will depend on the software and hardware systems chosen. It is understood that all such variations are within the scope of the application. Likewise, software implementations of the present application could be accomplished with standard programming techniques with rule-based logic and other logic to accomplish the various connection steps, processing steps, comparison steps and/or decision steps.

The foregoing description of embodiments of the application has been presented for purposes of illustration and description. It is not intended to be exhaustive or to limit the application to the precise form disclosed, and modifications and variations are possible in light of the above teachings, or may be acquired from practice of the application. The embodiments were chosen and described in order to explain the principles of the application and its practical application to enable one skilled in the art to utilize the application in various embodiments and with various modifications as are suited to the particular use contemplated.

Although the description contains many specificities, these specificities are utilized to illustrate some of the preferred embodiments of this application and should not be construed as limiting the scope of the application. The scope of this application should be determined by the claims, their legal equivalents, and the fact that it fully encompasses other embodiments which may become apparent to those skilled in the art.

What is claimed is:

1. An aircraft-based terrain display system configured to display a terrain image having a perspective view, comprising:
    a radar system configured to measure terrain data in proximity to an aircraft;
    a memory coupled to the radar system and configured to store terrain data associated with the terrain data collected from the radar system;
    a processor coupled to the memory and configured to use the terrain data stored in memory to generate the terrain image; and
    wherein the radar system is configured to share time between measuring the terrain data and weather data so that during first sweeps the radar system provides radar beams configured to return weather data and during second sweeps the radar system provides radar beams configured to return terrain data;
    wherein the processor is configured to limit the downward direction of the view angle of the perspective view to a determined maximum downward angle that hides areas of radar shadow.

2. The system of claim 1, wherein the terrain image is a contoured rendering of three dimensional terrain data.

3. The system of claim 1, wherein the memory includes one of a three-dimensional data set, a x-y-z data set, a row-theta-range data set, a row-elevation-range data set, an angle-space data set, a distance-from-center data set, a range-elevation data set, an angle-angle data set, or a volumetric data set.

4. The system of claim 1, further comprising a hazard engine configured to detect terrain hazards.

5. The system of claim 4, wherein the processor is further configured to use terrain hazards or obstacles detected by the hazard engine to modify the terrain image.

6. The system of claim 1, wherein the processor is further configured to color-code the terrain image based on altitude of the terrain to be displayed relative to a determined aircraft flight path.

7. The system of claim 1, wherein the processor is further configured to provide one of:
an icon on the terrain image, an audio warning, or a textural warning based on altitude of the terrain to be displayed relative to a determined aircraft flight path.

8. A method of generating a perspective terrain image, comprising:
determining terrain data using radar beams cast from an aircraft-based radar system, wherein the aircraft-based radar system is configured to share time between measuring the terrain data and measuring weather data so that during first sweeps the radar system provides radar beams configured to return weather data and during second sweeps the radar system provides radar beams configured to return terrain data;
determining weather data using radar beams cast from the aircraft-based radar system;
generating the perspective terrain image based on the determined terrain data;
determining a maximum downward view angle of the perspective terrain image that will hide areas of radar shadow;
limiting the downward direction of the view angle of the perspective terrain image to the determined maximum downward angle.

9. The method of claim 8, further comprising projecting three dimensional terrain data onto a two dimensional plane for immediate display as the perspective terrain image.

10. The method of claim 9, wherein the projection is completed to simulate a pilot's view of terrain contour from a cockpit window.

11. The method of claim 8, further comprising:
casting radar beams at multiple tilt angles;
receiving radar returns; and
sending the radar returns to a multi-scan multi-tilt memory.

12. The method of claim 8, wherein the aircraft-based radar system is one of a volumetric radar system, a sequential lobing radar system, a monopulse radar system, a conical scanning radar system, a multiple beams-on-receive radar system, or an interferometric radar system.

13. The method of claim 8, further comprising:
forming a composite data field of three dimensional terrain data in aircraft memory; and
processing the data of the composite data field to account for aircraft movement.

14. A radar-derived terrain display system for displaying a perspective terrain image, comprising:
means for determining terrain altitude data using an aircraft-based radar system, wherein the aircraft-based radar system is configured to share time between measuring the terrain data and weather data so that during first sweeps the radar system provides radar beams configured to return weather data and during second sweeps the radar system provides radar beams configured to return terrain data;
means for storing the determined terrain altitude data;
means for generating perspective terrain image based on the stored determined terrain altitude data;
wherein the view angle of the perspective terrain image approximates the viewing angle from a front cockpit window wherein the viewing angle is limited in the downward direction by a determined maximum downward angle that hides areas of radar shadow.

15. The system of claim 14, wherein the perspective terrain image is a synthetic image of the terrain ahead and below the aircraft.

16. The system of claim 14, further comprising means for identifying terrain hazard areas; and means for showing terrain hazard areas on the perspective terrain image.

* * * * *